Sept. 24, 1957 L. C. THAYER ET AL 2,807,755
PURGE UNIT
Filed Jan. 6, 1953

INVENTORS.
LOUIS C. THAYER
ALFRED D. ROBINSON
ROBERT A. CRANE
JOSEPH W. LEWIS, JR.
BY THEIR ATTORNEYS.
HARRIS, KIECH, FOSTER & HARRIS
By
Clarence F. Kiech

United States Patent Office 2,807,755
Patented Sept. 24, 1957

2,807,755
PURGE UNIT

Louis C. Thayer, Duarte, Alfred D. Robinson, Pasadena, Robert A. Crane, Pittsburg, and Joseph W. Lewis, Jr., San Marino, Calif., assignors to Arnold O. Beckman, Inc., South Pasadena, Calif., a corporation of California Application January 6, 1953, Serial No. 329,854

16 Claims. (Cl. 317—9)

The present invention relates in general to the purging of undesirable gaseous atmospheres by replacement with gaseous atmospheres lacking the undesirable characteristics. Purging of undesirable atmospheres with innocuous purge gases, which may be inert, is practiced for a variety of reasons. For example, if electrical equipment must be utilized in a potentially explosive atmosphere, it is conventional to locate such equipment in a cabinet or case which is at least substantially gastight and to continuously introduce a suitable purge gas into the cabinet or case to prevent the entry of the potentially explosive atmosphere thereinto. Similarly, equipment which must be used in a corrosive atmosphere is desirably located in a continuously purged cabinet or case if the equipment is likely to suffer damage from exposure to such an atmosphere. Purging of equipment cabinets or cases is also practiced for a variety of other reasons.

Various purge gases may be utilized, relatively inert gases, such as nitrogen, being preferable in many instances. However, the only fundamental requirement is that the purge gas be free of the undesirable characteristic or characteristics of the atmosphere which would otherwise invade the equipment case.

A primary object of the present invention is to provide a purge unit which may be attached to an equipment case and through which the desired purge gas is introduced into the equipment case. A related object is to provide such a purge unit which may be attached to the equipment case with, at most, only very minor modifications of the equipment case itself, other than to render the equipment case relatively gastight if it is not already so.

Another object is to provide a purge unit including a housing having therein a purge gas compartment which is provided with a purge gas inlet and a purge gas outlet, the housing being attachable to the equipment case with the purge gas outlet in registry with a purge gas intake provided in the equipment case. Any suitable existing opening in the equipment case may be utilized as the purge gas intake, or a suitable opening may be formed in the equipment case if no such opening already exists.

Another object is to provide a power supply circuit for electrical equipment in the equipment case which includes power supply leads adapted to extend from the purge gas compartment through the purge gas outlet in the purge unit housing and the purge gas intake in the equipment case into the interior of the equipment case and adapted to be connected to the electrical equipment therein. Thus, no separate entry opening into the equipment case for the power supply leads is required, which is an important feature.

Another object is to provide a purge unit which includes a pressure sensitive means located in the purge gas compartment and electrically connected to the power supply circuit for opening the power supply circuit whenever the purge gas pressure in the purge gas compartment drops below a predetermined value, whereby to eliminate any possibility of an explosion or other damage in the equipment case in the event of a failure of the purge gas supply system.

Another object is to provide means for preventing automatic reclosure of the power supply circuit upon restoration of the purge gas pressure to its predetermined value, and to provide resetting means, preferably manually operated, for rendering the reclosure-preventing means ineffective so that power may again be supplied to the electrical equipment in the equipment case. With this construction, any explosive or other undesirable gases which may have entered the equipment case during the drop in purge gas pressure may be purged thoroughly before the electrical equipment is turned back on. Various devices, such as latching devices, may be utilized to prevent automatic reclosure of the power supply circuit and, similarly, various resetting devices may be used.

In the particular embodiment of the invention elected for consideration herein, which is the presently preferred embodiment, the reclosure-preventing means comprises a latching relay located in the purge gas compartment and controlled by a pressure-sensitive switch therein, for opening and holding open the power supply circuit whenever the purge gas pressure drops below the predetermined value, the resetting means comprising a reset solenoid, controlled by an externally located, manually operable, reset switch, for unlatching the latching relay when it is safe to do so. However, as pointed out above, other means may be used and those herein mentioned are merely illustrative.

Another object is to provide a purge unit having a housing which includes an access compartment adjacent the purge gas compartment, the two compartments being separated by a partition which includes a sealed terminal panel having sealed terminals extending therethrough. The power supply circuit and the various elements associated therewith which are disposed in the purge gas compartment are connected to the terminals on the purge-gas-compartment side of the panel. Input leads extend into the access compartment through one or more conduit inlets and are connected to the terminals on the access-compartment side of the panel. Thus, the elements in the purge gas compartment are completely isolated, which is an important feature.

The foregoing objects, advantages and features of the present invention, together with various other objects, advantages and features thereof which will become apparent, may be attained with the exemplary embodiment of the invention which is illustrated in the accompanying drawing and which is described in detail hereinafter. Referring to the drawing.

Figure 1:
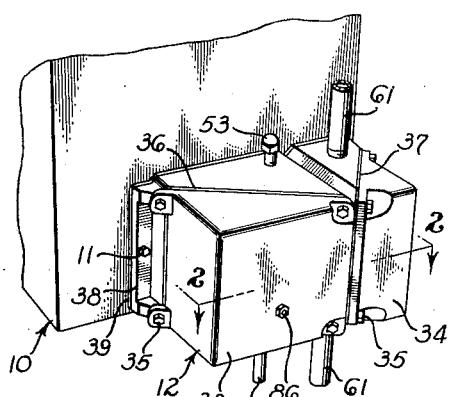
Fig. 1 is an isometric view fragmentarily illustrating an electrical equipment case with the purge unit of the present invention attached thereto.
Figure 2:
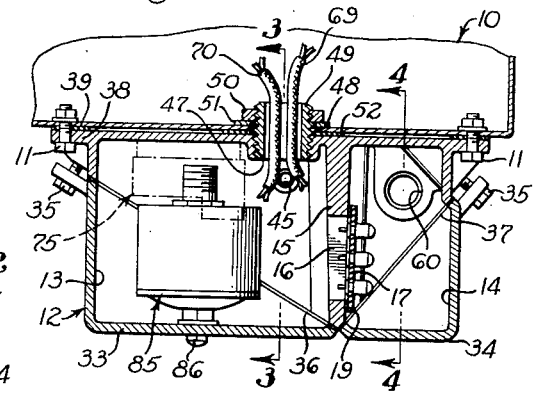
Fig. 2 is an enlarged sectional view taken along the arrowed line 2—2 of Fig. 1.
Figure 3:
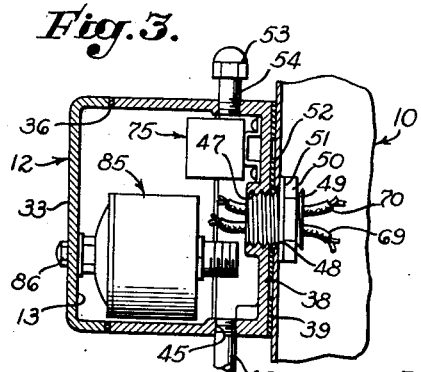
Figure 4:
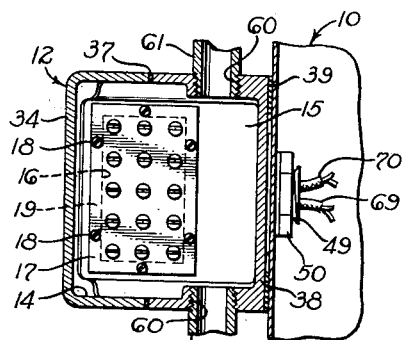
Figure 5:
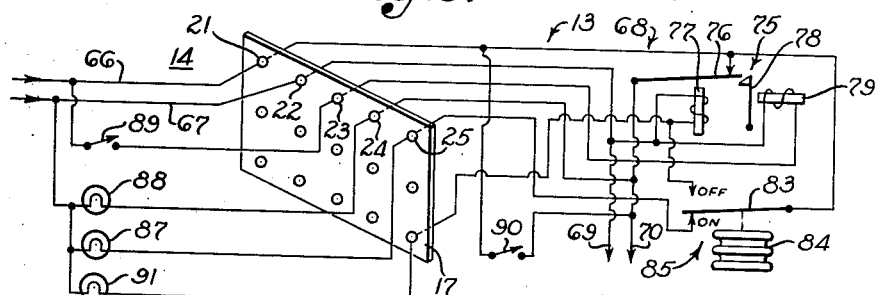

Figs. 3 and 4 are sectional views respectively taken along the arrowed lines 3—3 and 4—4 of Fig. 2; and Fig. 5 is a diagrammatic view illustrating the electrical circuitry of the purge unit of the invention.

In the drawing, the numeral 10 designates a cabinet or case containing electrical equipment, not shown, and attached to the equipment case 10, as by means of bolts 11, is a purge unit 12 of the invention. The purge unit comprises a housing which is divided into purge gas and access compartments 13 and 14 by a partition 15 having a window 16 therein. The window is closed by a terminal panel 17 of electrical insulating material, the terminal panel being secured to the partition 15 in any suitable manner, as by screws 18, and being sealed relative to the partition by a gasket 19. A plurality of terminals extend through and are suitably sealed relative to the terminal panel 17, certain of these terminals being identified by the numerals 21 to 25, respectively. Thus, the purge gas compartment 13 is completely isolated from the access compartment 14 by the partition 15 and the sealed terminal panel 17, the latter being regarded as forming part of the separating partition between the two compartments.

The purge gas and access compartments 13 and 14 are provided with removable covers 33 and 34 which are triangular in cross section in the particular construction illustrated, these covers being detachably connected to the housing of the purge unit 12 in any suitable manner, as by bolts 35, and being sealed relative thereto by gaskets 36 and 37, respectively. Thus, the compartments 13 and 14 are completely sealed relative to each other and the atmosphere, except for various inlets and outlets to be described in subsequent paragraphs. The housing of the purge unit 12 is provided with a flat base 38 which is adapted to seat against the equipment case 10 and to be secured thereto by the bolts 11, a gasket 39 being interposed between the base 38 and the equipment case 10 to provide a seal.

The purge gas compartment 13 includes a purge gas inlet 45 into which a purge gas supply line 46, connected to any suitable source of purge gas supply, not shown, may be threaded. A purge gas outlet 47 communicates with the interior of the purge gas compartment 13 and is adapted to register and communicate with the purge gas intake 48 in the equipment case 10. In the particular construction illustrated, a tube 49 is threaded into the purge gas outlet 47 and extends through the purge gas intake 48, a nut 50 being threaded on the end of the tube 49 which extends into the equipment case with a washer 51 being disposed under the nut. A gasket 52 preferably encircles the tube 49 and is disposed between the base 38 and the equipment case 10. The purge gas compartment 13 is preferably provided with a pressure relief valve 53 for limiting the maximum purge gas pressure in the compartment 13, this valve being threaded into an opening 54 in the purge unit housing.

The access compartment 14 is shown as provided with two conduit inlets 60 therein through which power input leads and other conductors to be described may be led into the access compartment, conduits 61 for enclosing such conductors being threaded into the conduit inlets 60.

Referring particularly to Fig. 5 of the drawing, two power input leads 66 and 67 extend into the access compartment 14 through one of the conduit inlets 60 and are connected to the terminals 21 and 22, respectively, on the access-compartment side of the terminal panel 17. Connected to the terminals 21 and 22 on the purge-gas-compartment side of the terminal panel 17 are leads of a power supply circuit 68. This circuit includes two power supply leads 69 and 70 which, as best shown in Figs. 2 to 4, extend from the purge gas compartment 13 through the purge gas outlet 47 and intake 48 into the interior of the equipment case 10, being connected to the electrical equipment, not shown, therein. In the particular embodiment disclosed herein, the power supply circuit 68 includes a latching relay indicated generally by the numeral 75, this relay including a switch 76 which is connected in series with the power supply lead 70 so as to open or close the power supply circuit 68, and which is adapted to be opened by energization of a solenoid 77. A latch 78 is adapted to hold the switch 76 open upon opening thereof by the solenoid 77, the latch being retractable to permit closure of the switch 76 by a reset solenoid 79. Thus, whenever the solenoid 77 is energized, the power supply circuit 68 is opened and held open, and whenever the reset solenoid 79 is energized, the latch 78 is retracted to permit reclosure of the power supply circuit.

A switch element 83 is movable between positions marked "on" and "off" in Fig. 5 of the drawing, this switch element being connected to a bellows 84 and being movable by the bellows from its "on" position to its "off" position by a reduction in pressure within the purge gas compartment 13 below a predetermined value, such reduction being indicative of a reduction in purge gas flow into the equipment case 10 below a safe value. As best shown in Fig. 3 of the drawing, both the latching relay 75 and a pressure sensitive switch 85 formed by the switch element 83 and the bellows 84 are disposed within the purge gas compartment 13. The pressure sensitive switch 85 is mounted in the cover 33 of the purge gas compartment 13 and is provided with a fitting 86 which is threaded through the cover to admit air into the interior of the bellows 84 to provide a constant reference pressure.

When the switch element 83 of the pressure sensitive switch 85 is in its "on" position, it is connected in series with a "purge on" light 87, or other indicator, through the sealed terminal 25, the light 87 preferably being located externally of the purge unit 12 in any suitable location. A remote "power on" light 88, or other indicator, is connected in series with the switch 76 through the sealed terminal 24, normal operation thus being indicated when both lights 87 and 88 are on, and abnormal when the light 88 is out, or both lights 87 and 88 are out. Preferably, an additional, "purge off," light 91, or other indicator, is connected to the "off" position of the switch element 83 through one of the sealed terminals on the panel 17, the "purge off" light 91 indicating that the purge gas pressure is too low. When the light 91 is used, normal operation is indicated when the lights 87 and 88 are on, and abnormal operation is indicated when the light 91 is on. Also, the light 91 provides a check of the conditions of the lights. For example, if none of the lights 87, 88 and 91 is on, a failure of one of the lights may have occurred and the lights should be checked. Similarly, if only the light 88 is on, failure of one of the lights 87 and 91 is indicated, etc.

When the switch element 83 is in its "off" position, it completes a circuit through the solenoid 77 of the latching relay 75 to open the switch 76 in response to a reduction in the purge gas pressure within the purge gas compartment 13 below a predetermined value, thereby opening the power supply circuit 68 to the electrical equipment within the equipment case 10. As hereinbefore indicated, the latch 78 holds the switch 76 open until such time as the reset solenoid 79 is energized.

The reset solenoid 79 is connected in series with a reset switch 89 through the sealed terminal 23, the reset switch 89 preferably being manually operable and being located at a remote control station located externally of the purge unit 12. Thus, whenever the reset switch 89 is closed, the power supply circuit 68 is reclosed because of the unlatching of the switch 76 by the reset solenoid 79.

Considering the over-all operation of the purge unit 12, it will be assumed that the desired purge gas pressure within the purge gas compartment 13 is being maintained. Under such conditions, the switch element 83 of the pressure responsive switch 85 is in its "on" position and the "purge on" light 87 is on to indicate this condition. Accordingly, the power supply circuit 68 is closed to supply power to the electrical equipment within the equipment case 10, and the "power on" light 88 is energized to indicate this condition. In the event that the purge gas pressure within the purge gas compartment 13 drops below a predetermined safe value, which indicates insufficient purging of the equipment case 10, the pressure sensitive switch 85 moves the switch element 83 to its "off" position. This results in energization of the solenoid 77 to open the power supply circuit 68, thereby cutting the power to the electrical equipment in the equipment case 10. The "power on" light 88 is de-energized and the "purge off" light 91 is energized at the same time to indicate this state of affairs so that the necessary corrective measures can be taken. The latch 78 holds the power supply circuit 68 open until such time as the necessary corrective measures have been taken. Before the reset switch 89 is operated under these conditions, the "purge on" light 87 is energized and the "purge off" light 91 is de-energized to indicate re-establishment of the purge pressure and the "power on" light 88 is off to indicate that the power supply circuit has not yet been closed. Upon closure of the reset switch 89, the reset solenoid 79 is energized to unlatch the switch 76, which will move to close the power supply circuit 68 only if the switch element 83 is in its "on" position. If it is not, the solenoid 77 will be energized to hold the power supply circuit open regardless of the position of the latch 78.

In Fig. 5 of the drawing, a switch 90 is shown as connected in parallel with the switch 76 of the latching relay 75 to permit closure of the power supply circuit independently of the switch 76. The switch 90, may, for example, be closed during such time as is required to make adjustments of elements within the equipment case 10. The switch 90 may be so positioned that it will automatically be opened whenever a door, not shown, of the equipment case 10 is closed preparatory to placing elements into normal operation.

Although an exemplary embodiment of our invention has been disclosed herein for purposes of illustration, it will be understood that various changes, modifications and substitutions may be incorporated therein without necessarily departing from the spirit of the invention.

We claim as our invention:

1. In a purge unit for attachment to the exterior of an equipment case containing electrical equipment and provided with a purge gas intake, the combination of: a housing having a purge gas compartment provided with a purge gas inlet and a purge gas outlet, said housing being attachable to the exterior of the equipment case with said purge gas outlet in registry with the purge gas intake to provide for purge gas flow from said purge gas compartment through said purge gas outlet and the purge gas intake into the interior of the equipment case; a power supply circuit for the electrical equipment in the equipment case; and pressure sensitive means operatively connected to said power supply circuit and located in said purge gas compartment for opening said power supply circuit whenever the purge gas pressure in said purge gas compartment drops below a predetermined value.

2. A purge unit according to claim 1 including means for preventing automatic reclosure of said power supply circuit and including manually-operable resetting means for rendering said reclosure-preventing means ineffective.

3. A purge unit as defined in claim 1 wherein said power supply circuit includes a latching relay located in said purge gas compartment for opening said power supply circuit, said latching relay being electrically connected to and controlled by a switch actuable by said pressure sensitive means.

4. A purge unit as defined in claim 1 wherein said power supply circuit includes a latching relay located in said purge gas compartment for opening said power supply circuit, said latching relay being electrically connected to and controlled by a switch actuable by said pressure sensitive means and including a reset solenoid for unlatching said latching relay.

5. A purge unit according to claim 4 including a manually operable reset switch electrically connected in circuit with said reset solenoid and located externally of said housing.

6. In a purge unit for use with an equipment case containing electrical equipment and having a purge gas intake, the combination of: a housing having a purge gas compartment provided with a purge gas inlet and a purge gas outlet, the latter being connectible to the purge gas intake of the equipment case to provide for purge gas flow from said purge gas compartment through said purge gas outlet and the purge gas intake into the equipment case; a power supply circuit for the electrical equipment in the equipment case and including power supply leads adapted to extend from said purge gas compartment through said purge gas outlet and the purge gas intake into the interior of the equipment case and to be connected to the electrical equipment therein; and pressure sensitive switch means electrically connected to said power supply circuit and located in said purge gas compartment for opening said power supply circuit whenever the purge gas pressure in said purge gas compartment drops below a predetermined value.

7. A purge unit according to claim 6 including means for preventing automatic reclosure of said power supply circuit and including manually-operable resetting means for rendering said reclosure-preventing means ineffective.

8. A purge unit as defined in claim 6 wherein said power supply circuit includes a latching relay located in said purge gas compartment for opening said power supply circuit, said latching relay being electrically connected to and controlled by said pressure sensitive switch means.

9. A purge unit as defined in claim 6 wherein said power supply circuit includes a latching relay located in said purge gas compartment for opening said power supply circuit, said latching relay being electrically connected to and controlled by said pressure sensitive switch means and including a reset solenoid for unlatching said latching relay.

10. A purge unit according to claim 9 including a manually operable reset switch electrically connected in circuit with said reset solenoid and located externally of said housing.

11. In a purge unit for attachment to an equipment case containing electrical equipment and having a purge gas intake, the combination of: a housing having therein a purge gas compartment provided with a purge gas inlet and a purge gas outlet, said housing being attachable to the equipment case with said purge gas outlet in registry and communication with the purge gas intake so as to provide for purge gas flow from said purge gas compartment through said purge gas outlet and the purge gas intake into the interior of the equipment case; a power supply circuit for the electrical equipment in the equipment case and including power supply leads adapted to extend from said purge gas compartment through said purge gas outlet and the purge gas intake into the interior of the equipment case and to be connected to the electrical equipment therein, said power supply circuit including a latching relay located in said purge gas compartment for opening and closing said power supply circuit, said latching relay including a reset solenoid for unlatching itself; and a pressure sensitive switch electrically connected to and controlling said latching relay and located in said purge gas compartment for actuating said latching relay to open said power supply circuit whenever the purge gas pressure in said purge gas compartment drops below a predetermined value.

12. A purge unit as defined in claim 11 including a manually operable reset switch in circuit with said reset solenoid and located externally of said housing for actuating said latching relay to unlatch same.

13. A purge unit as defined in claim 11 wherein said housing provides an access compartment adjacent said purge gas compartment and separated therefrom by a partition which includes a sealed terminal panel having electrical terminals extending therethrough, said power supply circuit being connected to said terminals on the purge-gas-compartment side of said panel, input leads being connected to said terminals on the access-compartment side of said panel.

14. A purge unit including: a housing having adjacent purge gas and access compartments separated by a partition which includes a sealed terminal panel having terminals extending therethrough, said purge gas compartment being provided with a purge gas inlet and a purge gas outlet, and said access compartment being provided with a conduit inlet; a power supply circuit connected to said terminals on the purge-gas-compartment side of said terminal panel; latching means located in said purge-gas-compartment for holding said power supply circuit open; reset means for unlatching said latching means; pressure sensitive means located in said purge-gas-compartment for opening said power supply circuit whenever the purge gas pressure in said purge gas compartment drops below a predetermined value; and power input leads extending into said access compartment through said conduit inlet and connected to said terminals on the access-compartment side of said terminal panel.

15. A purge unit as defined in claim 14 wherein said power supply circuit includes power supply leads extending out of said purge-gas-compartment through said purge gas outlet.

16. A purge unit as defined in claim 14 wherein said reset means includes a reset solenoid, said unit including an external, manually operable, reset switch connected in circuit with said reset solenoid through leads entering said access compartment through said conduit inlet and connected to other terminals on said terminal panel on the access-compartment side of said panel, said reset solenoid being connected to said other terminals on the purge-gas-compartment side of said panel.

References Cited in the file of this patent
UNITED STATES PATENTS

| | | |
|---|---|---|
| 1,670,697 | Treanor | May 22, 1928 |
| 1,819,245 | Jones | Aug. 18, 1931 |
| 1,899,746 | Brown | Feb. 28, 1933 |
| 2,089,988 | Webster et al. | Aug. 17, 1937 |
| 2,169,867 | Beeman | Aug. 15, 1939 |
| 2,240,922 | Bissell | May 6, 1941 |
| 2,467,181 | Barnard et al. | Apr. 12, 1949 |
| 2,511,631 | Gordon | June 13, 1950 |
| 2,724,581 | Pohl | Nov. 22, 1955 |